United States Patent [19]

Lopez et al.

[11] 4,073,461
[45] Feb. 14, 1978

[54] FENDER-MOUNT REAR VIEW MIRROR SUPPORT

[75] Inventors: Manuel Lopez, Trumbull, Conn.; Bernard C. Sharp, White Plains, N.Y.

[73] Assignee: Parker-Hannifin Corporation, Shelton, Conn.

[21] Appl. No.: 774,332

[22] Filed: Mar. 4, 1977

[51] Int. Cl.² .............................................. B60K 1/06
[52] U.S. Cl. ................................................ 248/475 R
[58] Field of Search ............... 248/226.2, 475 R, 476, 248/477, 478, 479, 480, 481, 482, 483, 484, 485, 486, 487

[56] References Cited

U.S. PATENT DOCUMENTS

| | | | |
|---|---|---|---|
| 3,259,349 | 7/1966 | Lee | 248/480 |
| 3,372,897 | 3/1968 | Lee | 248/480 |
| 3,420,490 | 1/1969 | Malachowski | 248/486 |
| 3,424,424 | 1/1969 | Kelley | 248/486 |
| 3,501,122 | 3/1970 | Barker | 248/486 |
| 3,729,163 | 4/1973 | Cummins | 248/487 |

*Primary Examiner*—William H. Schultz

*Attorney, Agent, or Firm*—Albert C. Johnston; Gerard F. Dunne

[57] ABSTRACT

A support device for easily mounting a rear view mirror onto a front wheel fender of a motor vehicle to enable viewing behind a hauled camper or other trailer comprises a pair of arms spaced apart laterally at their inner ends and adapted to protrude from the vehicle fender, a leg connected pivotably at its outer end with the outer ends of the arms, a mirror support means fixed at the junction of the leg and arm ends, and special coupling structures for interconnecting and converging intermediate portions of the arms and the leg so as to grip a fender tightly between footing members on their inner ends. The coupling structures include a bracket member having a base portion disposed above the arms by leg portions fastened respectively to respective intermediate portions of the arms, a saddle member straddling and fastened pivotably to the intermediate portion of the leg, and an elongate rigid coupling element which extends through an aperture in said base portion to engage with a retainer held in the saddle member and has an easily accessible head by which it is displaceable for mounting or dismounting mirror support device.

9 Claims, 2 Drawing Figures

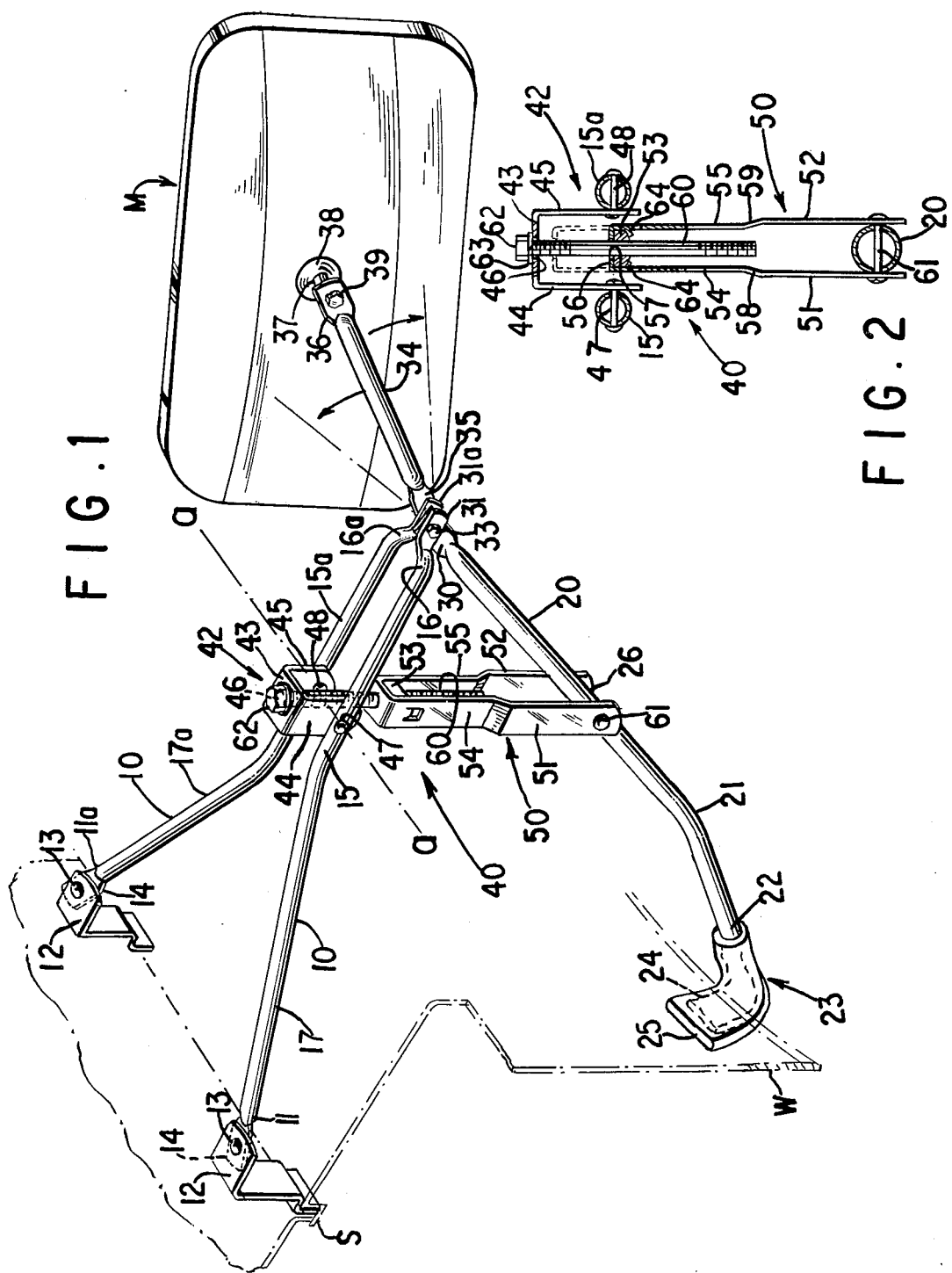

FENDER-MOUNT REAR VIEW MIRROR SUPPORT

This invention relates to a support for mounting a rear view mirror onto a front wheel fender of a motor vehicle so that the driver will have a wide angled mirror view reaching behind a camper or other trailer to be hauled by the vehicle.

Various forms of fender-mount rear view mirror supports are known. Some of these devices, for instance those set forth in U.S. Pat. Nos. 3,259,349 and 3,501,122, employ a tripod-type structure having divergent upper arms interconnected by a cross bar, and a leg which can be drawn toward the arms, for clamping a fender between footing members on the inner ends of the leg and arms, by rotation of a turnbuckle connected in a link between the leg and the cross bar.

Such tripod devices are rather inconvenient to mount on a fender for use, as it often is awkward to reach the turnbuckle and rotate it to the extent required for securely clamping the mirror support in place. Further, in order to adapt the structure for mounting on a fender having a relatively narrow span, the location of the turnbuckle link connection with the leg of the device needs to be changed by changing the position of a collar fastened to the leg. This in turn is often attended by so much loss of effective clamping force that the mirror support may become loosened by vibration in use on the vehicle.

The principal object of the present invention is to provide a fender-mount rear view mirror support which will securely hold a mirror in the desired outward position for viewing behind a vehicle trailer, and which avoids the above mentioned disadvantages of known devices.

Another object of the invention is to provide such a mirror support which can be quickly and easily folded into a flat configuration for shipment or for storage when not in use.

A further object is to provide such a mirror support which tends to frustrate casual pilferage by requiring the use of a tool for loosening it for removal from a fender.

The rear view mirror support device of the present invention includes a pair of arms spaced apart laterally at their inner ends and adapted to protrude from top portions of a front wheel fender of a motor vehicle, a leg to protrude from part of the fender bottom and connected pivotably with the arms at a junction of respective outer end portions of the leg and arms, means for supporting a mirror from that junction, and special coupling structures for interconnecting and converging intermediate portions of the arms and the leg so as to clamp footing members of their inner ends tightly against opposite edge portions of the fender engaged by these members. The special coupling structures include a bracket member having a centrally apertured base portion disposed above the arms of the device by leg portions fastened respectively to respective intermediate portions of the arms, a saddle member straddling and fastened pivotably to the intermediate portion of the leg of the device, and an elongate rigid coupling element typically a threaded bolt, is adapted to extend through the aperture in said base portion and engage with a retainer held in the saddle member, this coupling element having a head accessible from above said base portion by which it is displaceable for mounting or dismounting the mirror support device.

The leg portions of the bracket member preferably are fastened pivotably to arms of the device so that this member, with the elongate coupling element removed, can be swung to a position in which it extends along and between the arms for storage of the device in a substantially flat condition. Further for such purpose, the saddle member can be swung to a position lying next to the leg of the device and the leg then swung to a storage position between the arms.

For clamping the support device in place on a fender, or for dismounting it when required, the head of the elongate coupling element is conveniently accessible at a location above the support arms, where it is easily displaceable by an appropriate tool, such as a wrench, so as to tighten the device quickly in place or loosen it quickly for removal from the fender. The device can be mounted securely on fenders having either narrow or wide vertical spans by use of a coupling element having an appropriate length.

In a preferred form, the saddle member has a head portion which is narrower than the distance between the leg portions of the bracket member so that this head portion can be drawn to a position inside the bracket member for clamping the support device onto a fender of narrow span.

The foregoing and other objects, features and advantages of the invention will be further apparent from the following detailed description and the accompanying drawings of an illustrative embodiment. In the drawings:

FIG. 1 is a perspective view of a mirror support device according to the invention as it appears when mounted on a fender of relatively wide span.

FIG. 2 is an elevational view thereof, partly in section, showing a disposition of the coupling structures when the device is mounted on a fender of relatively narrow span.

The mirror support device provided according to the present invention includes a pair of arms 10 spaced apart laterally at their respective inner ends 11 and 11a and each made, preferably, from a rigid tube of corrosion resistant material such as cadmium or chromium plated steel, stainless steel, or aluminum. The inner ends are engaged with a top portion of a front wheel fender of a motor vehicle by suitable means such as a respective stepped footing member 12 connected pivotably as by rivet 13, to an ear 14 formed on each inner end. The footing members 12 are placed, in a known manner, between adjoining surfaces, represented in broken line S in FIG. 1, of the fender and the vehicle hood with the pair of arms protruding outwardly from the fender. A leg 20 preferably made from a rigid tube of corrosion resistant material and angled at a lower portion 21 extends outwardly and upwardly from its inner end 22 which is engaged with a bottom portion of the fender by suitable means such as a footing member 23. The footing member 23, which may comprise a hook formed by a flattened upturned portion 24 of the inner end 22 and a hollow extension 25 fitted thereover, is placed, in a known manner, beneath and behind the edge of a wheel well, represented in broken line W in FIG. 1, of the fender. The leg is connected pivotably with the pair of arms at a junction of respective outer end portions of the leg and the arms, and a rear view mirror M is supported from this junction. In the embodiment illustrated, an ear 30 formed on the upper end of the leg is placed between the ears 31 and 31a formed respectively on an outward end of each arm. Ears 30, 31 and 31a, together with washers therebetween, are fitted on a common bolt 33 and held thereon by a lock washer and nut (not shown) fitted upon the threaded end of bolt 33. A mirror support member 34 made preferably from a rigid tube of corrosion resistant material has formed on one end an ear 35 fitted upon the bolt 33 and held thereon by the nut and lock washer. Formed on the other end of member 34 is an ear 36 connected to the mirror M in a known manner, such as by being fitted over the outer end of a bolt 37 extending through a collar 38 to a spherical head received within a socket provided in the mirror base. A cap nut 39 and lock washer are tightened down over the bolt 37 to secure the support member thereto.

Respective intermediate portions of the pair of arms and the leg are interconnected and brought to converge by coupling structures 40 so as to clamp the footing members 12 and 23 tightly against the fender. The coupling structures 40 include a bracket member 42 made from a length of rigid, corrosion resistant material. The bracket member may take any form generally U-shaped and includes in its essentials a base portion 43 adapted to be disposed above the arms, a central aperture 46 in the base portion and leg portions 44 and 45 fastened respectively to respective intermediate portions 15 and 15a of the pair of arms. The coupling structures further include a saddle member 50 having leg portions 51 and 52 straddling and fastened pivotably, for instance, by a rivit 61, to an intermediate portion 26 of the leg. The saddle member holds a retainer which in the embodiment illustrated is constituted by a threaded square nut 53. An elongate rigid coupling element which in the embodiment illustrated is constituted by a threaded bolt 60, extends through the aperture 46 of the base portion for engagement with the nut. The head 62 of the bolt is held above the base portion and can be actuated for displacing the bolt relative to the nut for either clamping the footing members 1 and 23 tightly against the fender or releasing them therefrom.

The arms of the pair thereof are substantially parallel from their intermediate portions 15 and 15a to respective inturned portions 16 and 16a leading respectively to the ears 31 and 31a, and have portions 17 and 17a diverging from the intermediate portions to the respective inner ends 11 and 11a. The leg portions 44 and 45 of the bracket member are each fastened pivotably at their lower ends, for instance by respective rivets 47 and 48, to and between the respective intermediate portions of the pair of arms in a manner permitting the leg portions of the bracket member to each pivot about the common axis a—a. The leg portions 44 and 45 of the bracket member are each fastened to the respective intermediate portion at a location thereon proximate to the respective divergent portions 17 or 17a of the pair of arms. In this way, the perpendicular distance from the longitudinal axis of each divergent portion of the pair of arms to the point on the bracket member of application of the forces converging the respective intermediate portions of the pair of arms and the leg is kept to a minimum. Consequently, the torsion applied to each arm of the pair thereof, which may tend to loosen the stepped footing members 12 from the fender, is minimal.

The saddle memer 50 is made from a rigid corrosion resistant material and includes a head portion 54 adapted to extend toward the bracket member 42. The head portion includes sides 55 leading to a top 56 bridging the space between the sides and containing an aperture 57 above the nut. The leg portions 51 and 52 of the saddle member have respective inturned portions 58 and 59 leading into the head portion 54 and defining shoulders inside the saddle member. By means of the above construction, the head portion 54 of the saddle member is narrower than the distance between the leg portions 44 and 45 of the bracket member, whereby, as illustrated in FIG. 2, the head portion of the saddle member can be drawn to a position inside the bracket member when the support device is installed upon a fender of relatively narrow vertical span.

In the embodiment illustrated, the nut 53 is seated upon the underside of the top 56 of the head portion and retained in place by suitable means, for instance by having oppositely disposed portion 64 struck inwardly from the respective sides 55 to form lugs partially underlying the nut. Alternatively, the nut may be seated upon the shoulders formed by the inturned portions 58 and 59, in which case a nut of suitable size is placed immediately below in position to abut them and may be retained in place by any suitable means, such as lugs struck inwardly from the leg portions 51 and 52 so as to underlie the nut.

To fit the mirror support device upon a fender, which may have any of various vertical spans, the footing members 12 and 23 are placed against their respective fender portions before or after a nut threaded on bolt 33 is tightened sufficiently to hold the arms 10 and the leg 20 so that the footing members will stay so placed. A threaded bolt 60 having a lock washer 63 positioned beneath its head inserted through the aperture 46 of the bracket member 42 and engaged in the nut 53 fixed in saddle member 50. The bolt 60 then is rotated to converge the saddle member and the bracket member, for which purpose the bolt head 62, being in an accessible location above the plane of the arms 10, can be conveniently engaged and turned by an appropriate tool, such as a wrench, without obstruction of the path of the tool movement. This turning of the bolt converges intermediate portions of the arms and the leg until the fender is clamped tightly between the footing members 12 and 23, the morror support thus being securely fixed in place. Member 34 can then be pivoted about bolt 33 to place the mirror in a desired position for viewing behind a trailer hauled by the vehicle, and bolt 33 can then be further tightened to fix the mirror securely in the desired position. The structures described hold the mirror support device tightly in place, without danger of it being loosened by vibrations during operation of the vehicle. The bolt 60 is not normally loosenable by hand, but requires a suitable tool such as a wrench for turning its head to release the mirror support device from the fender; so the risk of casual pilferage of the device is reduced. After a period of use of the device, however, it can be removed readily from the vehicle by use of a tool, such as a wrench, to unscrew the bolt 60.

For use of the mirror support device on a fender having a relatively narrow vertical span, a bolt such as bolt 60 may be employed with a length shorter than that indicated in the drawing. When the mounting device is installed on a finder of relatively narrow span, the head portion 54 of the saddle member will often be drawn up to a position well inside the leg portions 44 and 45 of the bracket member 42, as indicated by the broken line in FIG. 2. In such position, the overlapping structures of the bracket member and saddle member will provide additional security against objectional deflection or distortion of the support device by torsional forces, such as forces which result from wind loading during operation of the vehicle.

The bracket member and the saddle member are fixed to respective intermediate portions of the arms 10 and leg 20 at locations approximately equidistant from the junction of the other portions of the arms and leg. Consequently, the clamping force exerted through them is kept predominantly transverse to the arms and the leg, whether the support device is mounted on a fender having a relatively wide or relatively narrow vertical span.

The mounting of the present invention may be quickly and easily folded into a substantially flat configuration for shipment or storage. With the bolt removed from between the bracket member and the saddle member, the bracket member 42 is swingable down into the space between the parallel portions of the arms, so into their plane. The saddle member can then be swung so as to lie next to and substantially along the leg in a position enabling the leg and saddle member to be brought substantially into the plane of the arms between the diverging portions thereof.

While the rear view mirror mounting of the present invention has been described and illustrated with reference to a particular embodiment thereof, it will be apparent that the new features herein set forth may also be employed in other forms while still utilizing the substance of the present invention which is intended to be defined by the appended claims.

What is claimed is:

1. A support for mounting a rear view mirror on a vehicle fender, comprising a pair of arms spaced apart laterally at their inner ends and adapted to protrude outwardly from the fender, said inner ends each having means thereon for engaging with a top portion of the fender, a leg adapted to extend outwardly and upwardly from and having means on its inner end for engaging with a bottom portion of the fender, means at a junction of respective outer end portions of the arms and leg for interconnecting the same pivotably, means for supporting a mirror from said junction, and coupling means for interconnecting and converging respective intermediate portions of said pair of arms and said leg so as to clamp said engaging means tightly against the fender, said coupling means including a bracket member having a centrally apertured base portion adapted to be disposed above said arms and leg portions fastened respectively to respective intermediate portions of said arms, a saddle member having leg portions straddling and fastened pivotably to said intermediate portion of said leg, a retainer held in said saddle member, and an elongate rigid coupling element adapted to extend through the aperture in said base portion for engagement with said retainer, said coupling element having a head held above said base portion and by which it is displaceable relative to said retainer for either clamping said engaging means tightly against the fender or releasing the same therefrom.

2. A mirror support according to claim 1, said saddle member having a head portion adapted to extend toward said bracket member and having an aperture in said head portion at a location above said retainer, said coupling element being adapted to extend from said base portion through said head portion aperture and thence into said retainer.

3. A mirror support according to claim 2, said head portion being narrower than the distance between said leg portions of said bracket member, whereby said head portion can be drawn to a position inside said bracket member.

4. A mirror support according to claim 2, said retainer being seated upon the underside of the top of said head portion.

5. A mirror support according to claim 2, said leg portions of said saddle member having respective inturned portions leading into said head portion and defining shoulders inside the saddle member, said retainer being seated upon said shoulders.

6. A mirror support according to claim 1, said leg portions of said bracket member being fastened pivotably on a common axis to said intermediate portions of said arms so that said bracket member, absent said coupling element, is swingable to extend along and between said arms.

7. A mirror support according to claim 1, said coupling element being a threaded bolt, said retainer being a threaded nut held between portions of said saddle member and adapted to receive the thread of said bolt.

8. A mirror mounting according to claim 1, said arms being substantially parallel from their said intermediate portions to said outer end portions thereof, and being divergent from their said intermediate portions to their inner ends.

9. A support for mounting a rear view mirror on a vehicle fender, comprising a pair of arms spaced apart laterally at their inner ends and adapted to protrude outwardly from the fender, said inner ends each having means thereon for engaging with a top portion of the fender, a leg adapted to extend outwardly and upwardly from and having means on its inner end for engaging with the bottom portion of the fender, means at a junction of respective outer end portions of said arms and leg for interconnecting the same pivotably, means for supporting a mirror from said junction, and coupling means for interconnecting and converging respective intermediate portions of said pair of arms and said leg so as to clamp said engaging means tightly against the fender, said coupling means including a bracket member having a centrally apertured base portion adapted to be disposed above said arms and leg portions fastened respectively to respective intermediate portions of said arms, a saddle member having leg portions straddling and fastened pivotably to said intermediate portion of said leg, a retainer held between portions of said saddle member, and an elongate rigid coupling element adapted to extend through the aperture in said base portion for engagement with said retainer, said coupling element having a head held above said base portion and by which it is displaceable relative to said retainer for either clamping said engaging means tightly against the fender or releasing the same therefrom, said saddle member having a head portion adapted to extend toward said bracket member and an aperture in said head portion at a location above said retainer, said coupling element being adapted to extend from said base portion through said head portion aperture and thence into said retainer, said head portion being narrower than the distance between said leg portions of said bracket member whereby said head portion can be drawn to a position inside said bracket member, said coupling element being a threaded bolt and said retainer being a threaded nut adapted to receive the thread of said bolt.

* * * * *